United States Patent
Santín Navarro

(10) Patent No.: US 12,145,525 B2
(45) Date of Patent: Nov. 19, 2024

(54) FASTENING DEVICE FOR A VEHICLE INTERIOR LINING, ARRANGEMENT OF A FASTENING DEVICE, AIRBAG MODULE AND METHOD FOR OPENING AN AIRBAG

(71) Applicant: DALPHI METAL ESPANA S.A., Vigo (ES)

(72) Inventor: Pedro José Santín Navarro, Vigo (ES)

(73) Assignee: DALPHI METAL ESPANA S.A., Vigo (ES)

( * ) Notice: Subject to any disclaimer, the term of this patent is extended or adjusted under 35 U.S.C. 154(b) by 0 days.

(21) Appl. No.: 18/019,584

(22) PCT Filed: Aug. 4, 2021

(86) PCT No.: PCT/EP2021/071745
§ 371 (c)(1),
(2) Date: Feb. 3, 2023

(87) PCT Pub. No.: WO2022/029166
PCT Pub. Date: Feb. 10, 2022

(65) Prior Publication Data
US 2023/0286459 A1  Sep. 14, 2023

(30) Foreign Application Priority Data

Aug. 6, 2020 (DE) ...................... 10 2020 120 774.3

(51) Int. Cl.
*B60R 21/213* (2011.01)
*B60R 13/02* (2006.01)
(Continued)

(52) U.S. Cl.
CPC .......... *B60R 21/213* (2013.01); *B60R 13/025* (2013.01); *B60R 21/2338* (2013.01); *B62D 25/04* (2013.01)

(58) Field of Classification Search
CPC . B60R 21/213; B60R 13/025; B60R 21/2338; B60R 13/0206; B60R 21/215;
(Continued)

(56) References Cited

U.S. PATENT DOCUMENTS 6,145,870 A * 11/2000 Devane ................. B60R 21/215
   280/730.2
6,155,594 A    12/2000 Ibe et al.
(Continued)

FOREIGN PATENT DOCUMENTS

DE    19622231 A1    2/1997
GB    2497652 A      6/2013
(Continued)

OTHER PUBLICATIONS

PCT International Search Report for corresponding International Application Serial No. PCT/EP2021/071745, mailed Dec. 1, 2021, pp. 1-4.
(Continued)

*Primary Examiner* — Drew J Brown
(74) *Attorney, Agent, or Firm* — Tarolli, Sundheim, Covell & Tummino LLP

(57) ABSTRACT

The invention relates to a mounting device (10) for a vehicle interior lining (95) for mounting to a vehicle body (90). According to the invention, the mounting device (10) comprises a mounting slide (20) that is configured for mounting a tether (60) of an airbag (85), wherein the mounting slide (20) can be actuated by the tether (60).

24 Claims, 5 Drawing Sheets

(51) Int. Cl.
*B60R 21/2338* (2011.01)
*B62D 25/04* (2006.01)

(58) Field of Classification Search
CPC ........ B60R 2021/21525; B60R 21/232; B62D 25/04
See application file for complete search history.

(56) References Cited

U.S. PATENT DOCUMENTS

| | | | |
|---|---|---|---|
| 6,402,188 B1 * | 6/2002 | Pasch | B60R 21/216 280/730.2 |
| 7,717,458 B2 * | 5/2010 | Tsuge | B60R 13/02 296/193.06 |
| 7,931,295 B2 | 4/2011 | Inui et al. | |
| 8,480,120 B1 * | 7/2013 | Fukuda | B60R 21/216 24/453 |
| 9,896,054 B2 * | 2/2018 | Arellano | B60R 21/213 |
| 11,440,485 B2 * | 9/2022 | Dubuisson | B60R 21/21 |
| 2007/0075531 A1 | 4/2007 | Tsuge | |

FOREIGN PATENT DOCUMENTS

| | | |
|---|---|---|
| JP | 3175582 B2 | 6/2001 |
| JP | 2002211345 A | 7/2002 |
| JP | 2011111001 A | 6/2011 |

OTHER PUBLICATIONS

German Search Report for corresponding German Application Serial No. 10 2020 120 774.3, dated Apr. 27, 2021, pp. 1-12.

* cited by examiner

FASTENING DEVICE FOR A VEHICLE INTERIOR LINING, ARRANGEMENT OF A FASTENING DEVICE, AIRBAG MODULE AND METHOD FOR OPENING AN AIRBAG

RELATED APPLICATIONS

This application is a U.S. National Stage Application filed under 35 USC 371, claiming priority to Serial No. PCT/EP2021/071745, filed on 4 Aug. 2021; which claims priority from German Patent Application DE 10 2020 120 774.3, filed 6 Aug. 2020, the entireties of which are hereby incorporated herein by reference.

TECHNICAL FIELD

The invention relates to a mounting device for a vehicle interior lining for mounting to the vehicle body. Further, the invention relates to an arrangement of at least one mounting device between a vehicle interior lining, especially an A pillar vehicle interior lining, and a vehicle body. The invention moreover relates to an airbag module. In addition, the invention relates to a method for opening an airbag, especially a curtain airbag.

BACKGROUND

Occupant restraint systems for motor vehicles are part of the essential standard safety systems in modern motor vehicles. These occupant restraint systems usually include airbag modules comprising an airbag which, in the event of a vehicle crash, is inflated to reduce the probability of body parts of a vehicle occupant colliding with a vehicle component.

Airbags of the type described herein, especially curtain airbags, may comprise one or more tethers by means of which the inflatable part of the airbag is mounted and guided, respectively, vis-à-vis the vehicle.

In the built-in condition, the airbag module, i.e. also the deflated airbag and optional tethers of the airbag are interposed between the vehicle interior lining and the vehicle body, the vehicle interior lining usually being mounted, especially locked or screwed, directly to the vehicle body.

In the case of activation, parts of the airbag and (where present) of the tether(s) exit clearances that are usually formed between the vehicle body and a vehicle interior lining.

Especially in the area of the A and C (or D) pillar vehicle interior lining it is imaginable, at least theoretically, that exceptional configurations of the lining could prevent the latter from being incompletely opened in adverse conditions or that the tether gets stuck or caught at corners or edges of the vehicle interior lining so that the airbag, especially the curtain airbag, cannot be inflated fully and/or in the optimum orientation and shape. This problem might theoretically arise if the A or C (or D) pillar vehicle interior lining was too stiff and/or too thick or was fastened too rigidly on the vehicle body.

SUMMARY

Consequently, the object underlying the invention is to state a mounting device for mounting a vehicle interior lining to a vehicle body so that, in the event of a release situation of an airbag, the opening behavior of the vehicle interior lining is improved.

Moreover, it is the object of the present invention to state an arrangement of at least one mounting device between a vehicle interior lining, especially an A pillar vehicle interior lining, and a vehicle body. It is another object of the invention to state an advanced airbag module. Further, it is an object of the present invention to state an advanced method for opening an airbag, especially a curtain airbag.

For achieving the afore-stated object, a mounting device according to claim 1 and an arrangement of at least one mounting device between a vehicle interior lining and a vehicle body as well as an airbag module according to the further independent device claims are suggested. Further, a method for opening an airbag, especially a curtain airbag, is suggested.

The mounting device according to the invention for mounting a vehicle interior lining on a vehicle body includes a mounting portion configured for mounting an airbag.

In other words, the mounting device according to the invention serves for mounting a vehicle interior lining on the vehicle body, so-to-speak as a separable intermediate piece. The vehicle interior lining may be any vehicle interior lining. In particular, the vehicle interior lining is a vehicle interior lining, wherein preferably at least one portion of a curtain airbag is stored in a space formed between said vehicle interior lining and the vehicle body. The vehicle interior lining is preferred to be an A pillar vehicle interior lining, a B pillar vehicle interior lining, a C pillar vehicle interior lining, a D pillar vehicle interior lining and/or a lining of plural of said pillars and/or a lining of an area between said pillars, etc.

As the mounting device according to the invention includes a mounting portion that is configured to mount an airbag, directed forces formed when the airbag is released and inflated, respectively, can be applied to the mounting device. Said forces can separate individual portions of the mounting device from each other and thus enable the respective vehicle interior lining to reliably detach from the vehicle body.

According to a preferred embodiment of the invention, the mounting device can be divided into several portions by activating the airbag. In this way, reliable release of the mounting of the vehicle interior lining from the vehicle body is achieved.

Further, a first one of the portions of the mounting device is preferred to be an upper casing and a second one of the portions of the mounting device is preferred to be a lower casing of a mounting case.

Further preferably, the two portions are releasably interconnected, especially by means of a plug connector.

It is equally preferred that the two portions are tightly interconnected, especially integrally formed and separable from each other along at least one predetermined breaking point or removable from their position relative to each other.

According to one embodiment of the invention, the mounting portion is formed on another portion which is interposed between the first portion and the second portion.

Accordingly, the further portion may be configured as a mounting slide which holds the two portions in the form of an upper casing and a lower casing together with positive fit, especially by engaging behind respective retaining projections formed on the same.

Likewise, the further portion can be tightly connected to, especially formed integrally with, the two portions and can be separable from the latter along at least one respective predetermined breaking point such that they are also separated from each other in this way.

According to a preferred embodiment, it is suggested that the upper casing includes at least one mounting pin for mounting, especially locking, on the vehicle interior lining and/or the lower casing includes at least one mounting foot, preferably at least two mounting feet, for mounting, especially locking, on the vehicle body.

It is further suggested that at least one of the portions, preferably the upper casing, is formed integrally with the vehicle interior lining. Thus, it is also imaginable that the mounting device is part of the vehicle interior lining and/or that the vehicle interior lining is part of the mounting device, especially when an integral design (e.g. injection-molded in one piece) is provided.

According to another embodiment, the further portion is formed directly on and integrally with the vehicle interior lining such that it can be separated therefrom along a predetermined breaking point so that also the lower casing is separated from the vehicle interior lining in this way. The upper casing thus can be saved—while the functionality is maintained—.

Preferably, the airbag includes a tether disposed on an inflatable portion of the airbag. Preferably, the airbag is mounted to the mounting portion of the mounting device by means of said tether. The airbag in particular is a curtain airbag, and the tether in particular is a front tether, i.e. a tether facing forward in the vehicle travel direction.

According to a preferred configuration of the invention, the upper casing and/or the lower casing is/are provided to have a groove-shaped recess in which the mounting slide is/can be mounted with positive fit.

Also, the mounting slide can include, on its upper side and/or on its lower side, at least one locking element that engages in a complementary locking seat of the upper casing and/or the lower casing (or vice versa).

The mounting portion in the form of a mounting slide preferably has a bearing surface, especially a bearing member, on which the airbag, especially the tether thereof, rests and on which the tether can be mounted to the mounting slide. The mounting slide can be actuated by the tether. In other words, the mounting slide may carry out a movement when the tether moves. Consequently, actuation of the mounting slide relates to the movement or change of position of the mounting slide in relation to further components or, resp., portions of the mounting device.

The mounting device preferably includes a mounting case in which the mounting slide is arranged. Preferably, the mounting case is formed of at least two parts. The mounting device in total is preferably formed of at least three parts. A first part can be formed by the mounting slide and the two further parts are preferably configured as portions or elements of the mounting case.

Preferably, a/the at least two-part mounting case includes an upper casing and a lower casing. The upper casing and the lower casing are interconnected preferably releasably, especially by means of a plug connector.

In another embodiment of the invention, the mounting slide is formed between the upper casing and the lower casing. Since the upper casing and the lower casing are preferably releasably interconnected, the connection between the upper casing and the lower casing can be released by movement of the mounting slide so that the mounting device is specifically destroyed upon actuation of the mounting slide and/or the individual parts of the mounting device are specifically detached from the mounting case or from each other.

The mounting case preferably is in the form of a clip. The preferably three individual parts provided, i.e. the mounting slide, the upper casing and the lower casing, are preferably interconnected by means of plug connectors.

The mounting slide and, resp., the further portion preferably has a through-opening in which a tether can be provided. In other words, the tether can be passed through said through-opening. Moreover, the mounting slide can include a bearing portion or an extension. Preferably, the tether is connected to the mounting slide on said extension or bearing portion, respectively. In particular, the tether is stitched and/or welded and/or glued and/or riveted to the mounting slide.

The upper casing can include at least one mounting pin. The lower casing can include at least one mounting foot, preferably two mounting feet. The upper casing preferably is understood to be the part of the mounting case formed in the direction of the vehicle interior lining. The lower casing becomes especially the part of the mounting case which is formed in the direction of the vehicle body.

The mounting pin of the upper casing may include a cap or, resp., a mushroom-shaped member by means of which the upper casing and thus the mounting device can be mounted, especially click-fastened, to the vehicle interior lining.

The at least one mounting foot, especially the at least two mounting feet, is/are preferably configured so as to be resilient. The mounting foot or feet, resp., especially serve for mounting the lower casing and thus the mounting case to the vehicle body. For mounting the lower casing and, resp., the mounting device to the vehicle body, the mounting feet can initially be compressed to be inserted into a respective locking position. Subsequently, the mounting feet can return to the original shape when being appropriately relieved so that they are connected to the vehicle body.

The upper casing and/or the lower casing may include a groove-shaped recess. In the groove-shaped recess or recesses, the mounting slide can be safely mounted. The mounting slide and the mounting case are thus interconnected by means of a tongue and groove connection.

For fastening the upper casing to the lower casing, a plug connector can be formed between the upper casing and the lower casing. It is especially possible that either of the casing parts, especially the upper casing, includes pins that can engage in openings, especially bores, of the other casing part, especially the lower casing. It is further possible that the upper casing is glued to the lower casing, the adhesive power having to be selected such that the two casing parts are enabled to be easily detached. Even a one-piece design having predetermined breaking points between the portions of the mounting case is imaginable.

Moreover, the mounting slide can have at least one locking element on the upper side and/or on the lower side. The upper side of the mounting slide is preferably meant to be the side of the mounting slide facing the upper casing. The lower part of the mounting slide, on the other hand, is preferably meant to be the side of the mounting slide that faces the lower casing. The at least one locking element preferably engages a recess formed to be complementary to the locking element of a/the upper casing and/or a/the lower casing.

The at least one locking element can be especially burl-shaped, wherein the burl-type locking element engages in a recess of a/the upper casing and/or a/the lower casing formed complementarily to the burl shape. It is even possible to design a pointed locking element, for example in the form of a cone or a pyramid. Preferably, the mounting slide includes at least one, preferably at least two, locking element(s) both on the upper side and on the lower side.

A/the upper casing and a/the lower casing can be interconnected by means of a safety line. This prevents the mounting case, especially the upper casing and the lower casing, from being thrown randomly across the vehicle interior when the mounting device is specifically broken apart or destroyed. The safety line can be formed integrally with one or more portions of the mounting case.

In particular, the mounting device is configured so that the mounting strength between the lower casing and the vehicle body is higher than the mounting strength between the upper casing and the lower casing.

In an especially preferred embodiment of the invention, both the upper casing and the lower casing remain fastened on the vehicle body (here lower casing) and on the vehicle interior lining (here lower casing) when the connection between the two casing parts is specifically broken apart or specifically destroyed. If a safety line is formed between the upper casing and the lower casing, the vehicle interior lining is thus not thrown unhindered into the vehicle interior. Due to the safety line formed, the vehicle interior lining can be pulled after a first pulse, especially after a first opening pulse and subsequent deployment of the airbag, in the direction of the vehicle body again. Thus, the probability of a vehicle occupant being contacted by vehicle interior lining parts thrown around is reduced.

In other words, the mounting device, especially the mounting case, is divided in two parts by actuation of the mounting slide so that, upon release of an airbag, the vehicle interior lining is separated from the vehicle body and thus the airbag can deploy in the vehicle interior.

The mounting device can be manufactured from plastic material. In particular, the, especially two-part, mounting case can be manufactured from plastic and can consist of plastic material, respectively. In other words, an upper casing and/or a lower casing can be manufactured of plastic material. The mounting slide can equally consist of plastic material. It is especially possible for the mounting slide to consist of plastic material that is softer compared to the mounting case. This helps realize stitching of a tether to the mounting slide, especially to an extension or, resp., a bearing portion of the mounting slide.

Within the scope of an independent aspect, the invention is based on the idea to describe an arrangement comprising at least one afore-described mounting device (according to any one of the claims 1 to 8) and one vehicle interior lining, especially A, C or D pillar vehicle interior lining, and/or comprising a vehicle body.

In accordance with the invention, the vehicle interior lining is fastened to the vehicle body by means of the at least one mounting device in a built-in state. An airbag, especially a tether of the airbag, is connected, especially stitched and/or welded and/or glued and/or riveted, to the mounting portion.

In the case of activation of an airbag and/or an airbag module, the airbag is initially slightly inflated or filled. This helps actuate and, resp., tension a tether of the airbag so that the mounting slide connected to the tether is actuated. The mounting device can be divided, especially divided into two parts, by the mounting slide so that the mounting between the vehicle interior lining and the vehicle body can be released.

Due to the configuration of the mounting device according to the invention, vehicle interior linings, especially A pillar vehicle interior linings, can be variably designed. Neither the stiffness of the vehicle interior lining nor the shape of the vehicle interior lining, especially the edges and corners formed, have to be designed taking the options of detaching from the vehicle body into account any longer.

So-called covered or hidden "weather strip concepts" can be implemented now, as the mounting device according to the invention need not be formed at any particularly predetermined location between the vehicle interior lining and the vehicle body.

In addition, the mounting device according to the invention helps efficiently avoid the risk of the tether getting caught by a portion of the vehicle interior lining.

The configuration of the mounting device according to the invention permits rotation or twisting of the mounting device. In cases where the force exerted by the tether is not applied in the orientation of the mounting device, the mounting device can be rotated without being destroyed or separated, and thus without the connection between the vehicle interior lining and the vehicle body being released.

With respect to an airbag module, the object is achieved by the features of claim 10. Accordingly, an airbag module comprises an inflator, an airbag inflatable by the inflator and a device for arranging the airbag module in a vehicle.

In accordance with the invention, the airbag is provided to be connected, directly or by means of a tether, to at least one mounting device according to the afore-described type.

The airbag module according to the invention is arranged, in a non-activated condition of the airbag, between a vehicle interior lining and the vehicle body. The vehicle interior lining is connected to the vehicle body in the non-activated condition of the airbag by means of the mounting device according to the invention. In an especially preferred embodiment of the invention, the airbag module is a curtain airbag module. The vehicle interior lining preferably is an A pillar vehicle interior lining.

Preferably the airbag, especially a curtain airbag, includes at least one tether connected to at least one mounting device according to the invention. In other words, the at least one tether of an airbag is fastened to at least one mounting device according to the invention.

In another aspect of the present invention, a method for opening an airbag, especially a curtain airbag, of an airbag module according to the invention and/or of a vehicle safety system according to the invention is described.

The method according to the invention comprises the following steps of:
 triggering the inflator;
 at least partially filling the airbag, especially the curtain airbag;
 at least partially separating the mounting portion (21) connected to the airbag (85) from at least one further portion (40, 50) of the mounting device (10);
 at least partially releasing the connection between the vehicle interior lining and the vehicle body (90).

In other words, the method according to the invention is based on the fact that in a trigger situation an inflator of an airbag module or a vehicle safety system is triggered.

Following step a), the airbag, especially the curtain airbag, is at least partially filled.

In step b), the volume of the filled airbag increases.

In step c), the longitudinal extension of the airbag is reduced and at least one tether formed thereon is tensioned due to the increasing volume of the airbag. The tether is tensioned in the direction of the partially filled airbag and is pulled in the direction of the at least partially filled airbag, especially of the partially filled curtain airbag. It is especially possible that the tether is pulled at least 50 mm in the direction of the partially filled airbag. Since the tether is connected to the mounting device, especially to the mounting slide, the mounting slide, too, is pulled in the direction of the at least partially filled airbag.

If the airbag module according to the invention and, resp., the vehicle safety system according to the invention is related with a curtain airbag module and, resp., a curtain airbag safety system, a tether that is preferably formed in the area of the A pillar and thus a mounting device formed in the area of the A pillar, especially the mounting slide, is pulled starting from the A pillar toward the vehicle tail.

The mounting slide is released from the mounting device while being pulled or moved, resp., toward the partially filled airbag, especially toward the vehicle tail. In particular, the mounting slide is pulled at least partially out of the, especially at least two-part, mounting case.

The mounting slide includes at least one locking element preferably on the upper side and/or on the lower side. Due to the forces acting on the locking element, the connection between the preferably formed upper casing and the lower casing is released. In other words, the mounting device is divided into at least two parts so that the connection formed between the vehicle interior lining and the vehicle body is partially released (due to the mounting device). This can also be effectuated by separating or breaking the mounting device, especially in the case of an integrally formed variant.

As a consequence, the vehicle interior lining is at least partially detached from the vehicle body. Since the vehicle interior lining is detached from the vehicle body, the tether can detach from the clearance formed between the vehicle interior lining and the vehicle body and thus can be unfolded and, resp., specifically deflected into the vehicle interior.

The initial movement of the curtain airbag, i.e. the initially provided tensioning of the tether and, resp., the movement of the tether in the direction of the partially filled airbag causes the vehicle interior lining to be automatically detached from the vehicle body.

In another embodiment of the method according to the invention, the release, especially the degree of release, of the connection between the vehicle interior lining and the vehicle body is limited by a safety line that is formed between the upper casing and the lower casing.

The degree of opening of the vehicle interior lining in relation to the vehicle body thus can be controlled due to an at least two-part mounting case being configured to comprise a safety line.

BRIEF DESCRIPTION OF THE DRAWINGS

Hereinafter, the invention shall be illustrated in detail by way example embodiments with reference to the attached schematic drawings. Further features and advantages of the invention will be evident from the following description in combination with said drawings, wherein.

DESCRIPTION

Figure 1:
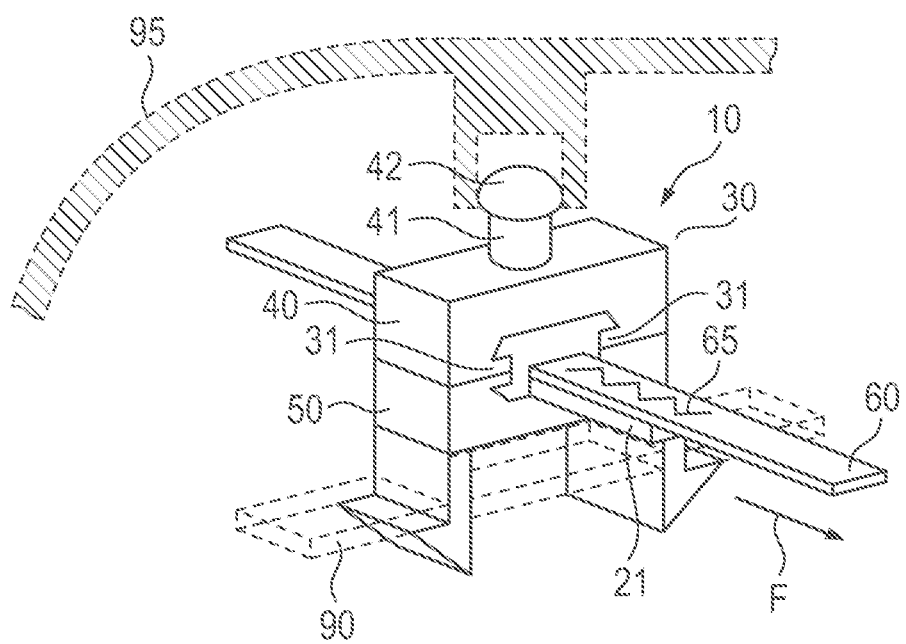
FIG. 1 shows a mounting device according to the invention in accordance with a first embodiment of the invention.

In the following, like reference numerals will be used for like and equally acting parts.

In FIG. 1, a mounting device 10 according to a first embodiment is shown.

The mounting device 10 comprises a mounting case 30 and a mounting slide 20. The mounting slide 20 is configured to mount a tether 60. The partly shown tether 60 is schematically illustrated to be stitched to the mounting slide 20. A seam 65 is indicated.

The mounting slide 20 is located in the mounting case 30. The mounting case 30 is configured in two parts. The mounting case 30 is formed by an upper casing 40 and a lower casing 50. The upper casing 40 and the lower casing 50 are interconnected by means of a plug connector.

By actuation of the mounting slide 20, i.e. by pulling the tether 60 in the actuating direction F, the mounting slide 20 can also be moved in the direction F. The plug connector between the upper casing 40 and the lower casing 50 causes the connection between the two housing parts 40 and 50 to be released.

Figure 2A:
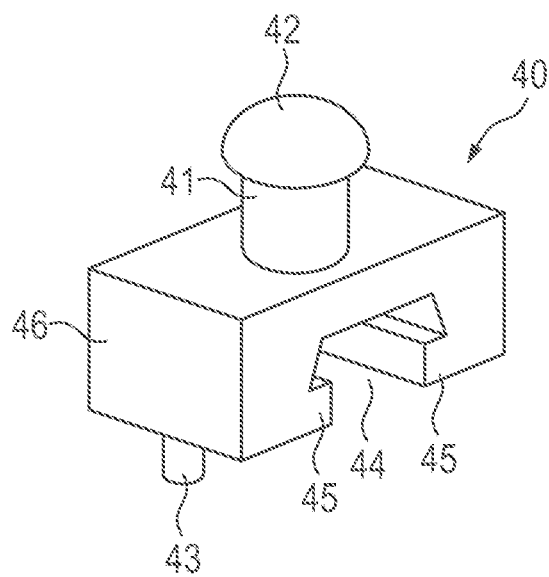
FIG. 2a is a representation of an upper casing of the mounting device.

The mounting device 10 in the illustrated example comprises the three individual components, viz. a mounting slide 20 as well as an upper casing 40 and a lower casing 50. The three components are shown in more detail in FIGS. 2a to 2c.

The upper casing 40 (cf. FIG. 2a) initially has a mounting pin 41. A mounting cap 42 is located on the mounting pin 41. The mounting cap 42 serves for mounting the upper casing 40 to a vehicle interior lining 95, especially to an A pillar vehicle interior lining. The design of a mounting cap 42 and, resp., the spherical design at least in portions or, resp., hemispherical or mushroom-shaped design of the end of the mounting pin 41 enables the upper casing 40 to rotate in the state connected to the vehicle interior lining 95.

The upper casing 40 further includes mounting journals 43. FIG. 2 illustrates only one of the two mounting journals 43. The mounting journal 43 serves for connecting the upper casing 40 to a lower casing 50. Further, a groove-shaped recess 44 is visible. The groove-shaped recess 44 serves for positively fastening the mounting slide 20 to the mounting case 30, and in this case to the upper casing 40.

Figure 2B:
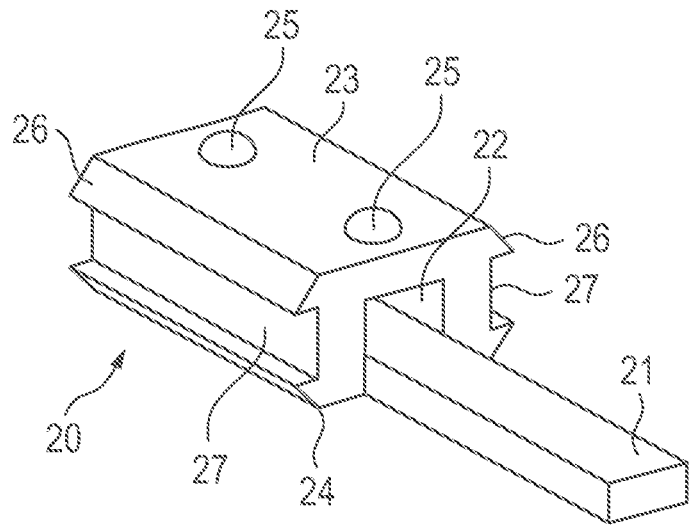
FIG. 2b is a representation of a mounting slide of the mounting device.

FIG. 2b illustrates the mounting slide 20 in a detached condition. The mounting slide 20 includes an extension 21. The extension 21 serves for bearing or as a bearing portion for a tether portion 60. The mounting slide 20 moreover includes a through-opening 22. The tether 60 can initially be passed through the through-opening 22 so as to be subsequently connected, especially stitched, to the extension 21.

The mounting slide 20 includes locking elements 25 both on the upper side 23 and on the lower side 24. The locking elements 25 are in the form of conical portions. The locking elements 25 engage in recesses of the upper casing 40 and of the lower casing 50. The recesses are shown merely in connection with the lower casing (cf. FIG. 2c). In other words, the locking elements 25 engage in the recesses 56. The upper side 23 of the mounting slide 20 faces the upper casing 40. The lower side 24 of the mounting slide 20 faces the lower casing 50.

Groove-shaped recesses 27 are formed at the lateral surfaces 26 of the mounting slide 20. Thus, between the mounting slide 20 and the mounting case 30 two lateral tongue-and-groove connections can be established. Portions of each of the upper casing 40 and of the lower casing 50 are configured as tongue. In other words, the tongue 31 has a two-part design. The tongue 31 is formed by tongue portions 45 of the upper casing 40 (cf. FIG. 2a) and by tongue portions 55 of the lower casing 50. Each of the tongue portions 45 and 55 forms a lateral tongue 31 of the mounting case 30 (cf. FIG. 1).

The upper side 23 as well as the lower side 24 of the mounting slide 20 are configured as tongues that engage in the groove-shaped recess 44 of the upper casing 40 and in the groove-shaped recess 54 of the lower casing 50. In this context, an upper tongue-and-groove connection and a lower tongue-and-groove connection thus can be formed between the mounting slide 20 and the mounting case 30.

The already illustrated locking elements 25 are formed so as to prevent the mounting slide 20 from easily slipping through or withdrawing.

Figure 2C:
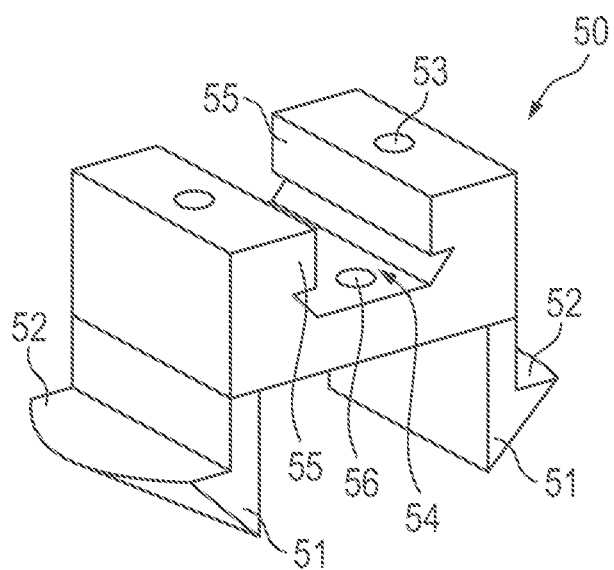
FIG. 2c is a representation of a lower casing of the mounting device.

FIG. 2c shows the lower casing 50. The lower casing 50 includes plug holes 53 into which the mounting journals 43 of the upper casing 40 (cf. FIG. 2a) can be inserted. Accordingly, at least one plug connector can be formed between the upper casing 40 and the lower casing 50.

On the side of the lower casing 50 facing away from the upper casing 40, mounting feet 51 having associated clamping lugs 52 are formed. The mounting feet 51 serve for connecting the lower casing 50 to the vehicle body. The mounting feet 51 are preferably resilient or elastic so that, for fastening the lower casing 50 to the vehicle body, the mounting feet 51 initially can be compressed. After connecting and, resp., inserting the mounting feet 51 into a vehicle body portion, the mounting feet 51 adopt their original shape so that the clamping lugs 52 allow for a clamping connection of the lower casing 50 to the vehicle body.

Figure 3A:
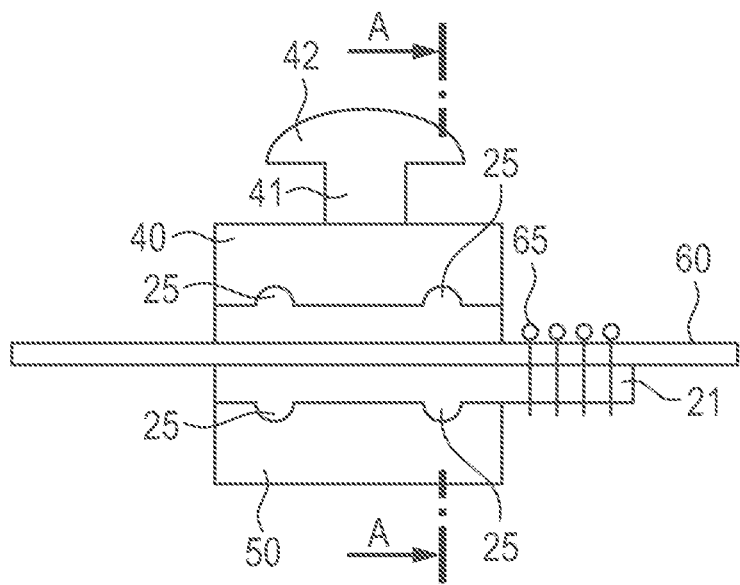
FIGS. 3a and 3b show sectional views of the mounting device according to the invention and of a tether connected thereto.

In FIG. 3a, a longitudinal section across the assembled mounting device 10 and a tether 60 connected to the mounting device 10 are shown. As already illustrated, the tether 60 is connected to the extension 21 of the mounting slide 20 by a seam 65. It is further evident from FIG. 3a that both on the upper side 23 and on the lower side 24 of the mounting slide 20 locking elements 25 are formed. Each of the locking elements 25 engages in a recess of the upper casing 40 and of the lower casing 50.

Figure 3B:
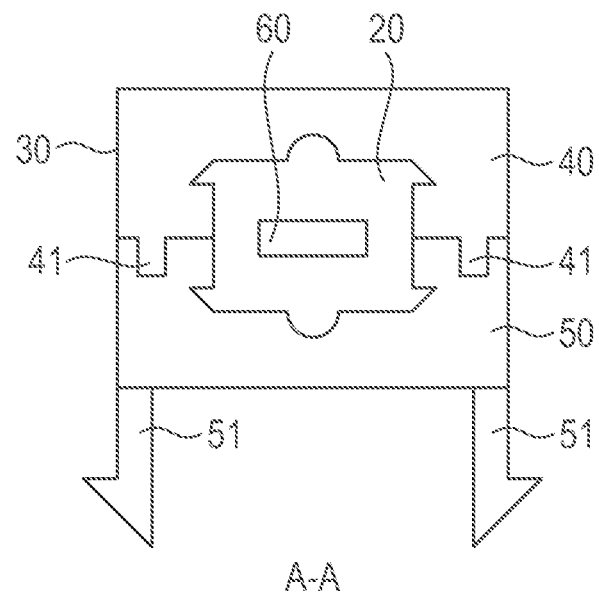

It is illustrated in FIG. 3b that the locking elements 25 are formed on a central longitudinal axis of the mounting slide 20.

Furthermore, it is evident from the section A-A shown in FIG. 3b that the upper casing 40 includes two mounting pins 41 which are inserted in plug holes 53 of the lower casing 50.

Figure 4:
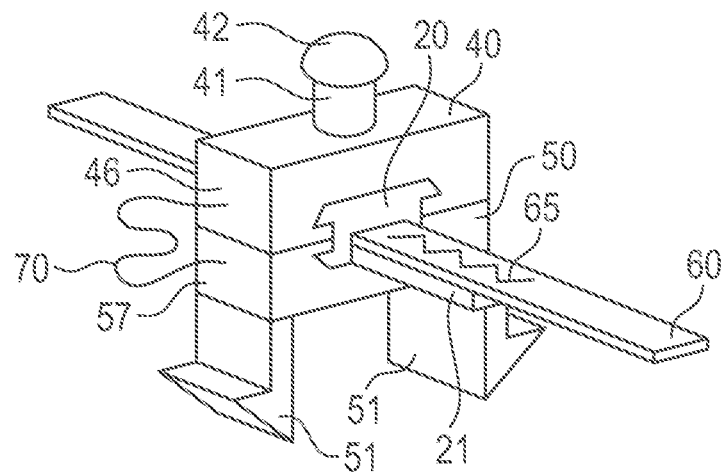
FIG. 4 shows a mounting device according to a second embodiment of the invention.

FIG. 4 shows another embodiment of a mounting device 10 according to the invention which comprises a safety line 70. The upper casing 40 and the lower casing 50 are connected by means of said safety line 70. Preferably, the safety line 70 is formed on one side of the mounting case 30 only. In other words, the safety line 70 is formed and fastened, resp., at one end on the lateral surface 46 of the upper casing 40 and at the other end on the lateral surface 57 of the lower casing 50.

The safety line 70 causes the upper casing 40 to be moved away from the lower casing 50 only at a limited distance in relation to the lower casing 50. A so-called "bungee effect" is brought about which causes the upper casing 40 and thus the vehicle interior lining connected to the upper casing 40 to be moved, after a first trigger pulse, toward the vehicle body again. The vehicle interior lining thus is not randomly thrown around in the vehicle interior.

Figure 5A:
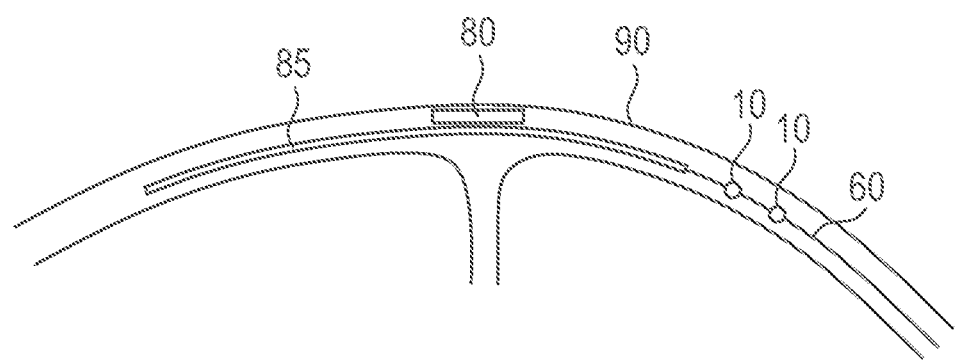
FIGS. 5a and 5b show schematic views of a vehicle safety system according to the invention and the release of the associated airbag.

FIG. 5a illustrates an inflator 80 as well as an airbag 85 communicated with the inflator. In the shown embodiment, the airbag 85 is a curtain airbag 85. The curtain airbag 85 is disposed in the area of the lateral vehicle ceiling and, in the shown example, extends from the A pillar to the C pillar. The airbag 85 comprises a tether 60. Said tether 60 is mounted in the area of the A pillar 90 by two mounting devices 10 configured in accordance with the invention.

Figure 5B:
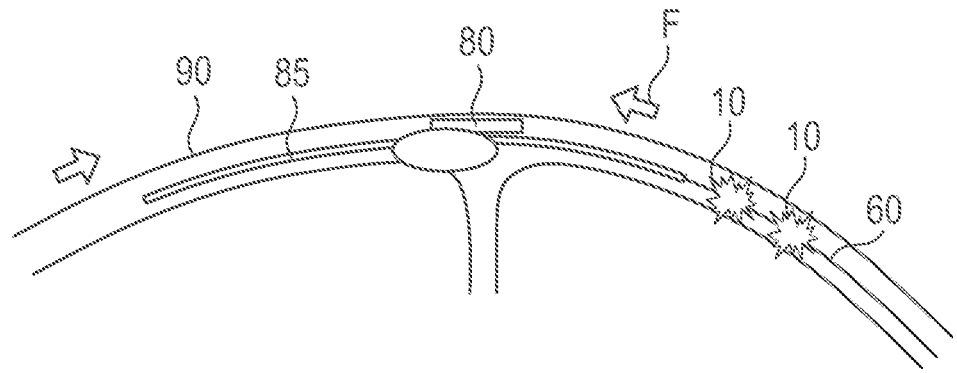

In FIG. 5b, the first release moment of an airbag 85 is shown. The airbag 85 is partially filled with gas. Therefore, the tether 60 is pulled in the direction F. In so doing, the tether can be pulled approx. 50 mm, for example, in the direction of the partially inflated airbag 85 and thus in the direction of the vehicle 6. The movement of the tether 60 in the direction F helps release the connection to the mounting devices 10. In other words, the mounting devices 10 are divided into at least two parts so that a connection between the vehicle interior lining and the vehicle body (here A pillar 90) is released. An opening toward the vehicle interior is formed so that the tether 60 and subsequently the airbag 85 can be moved directed toward the vehicle interior.

Figure 6:
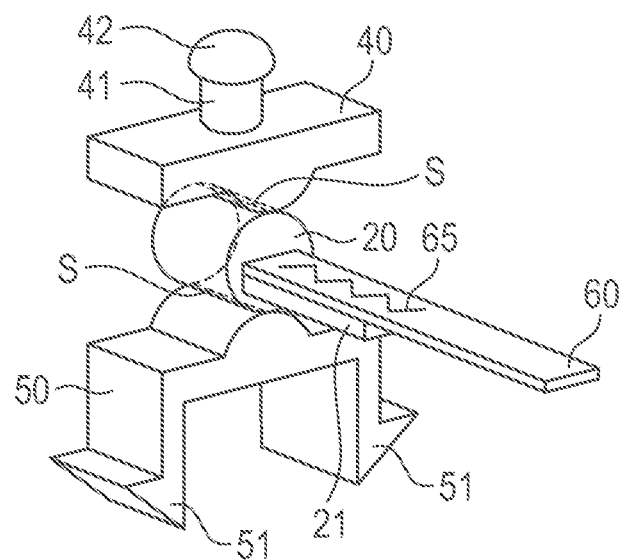
FIG. 6 shows a mounting device according to a third embodiment of the invention.

FIG. 6 illustrates another embodiment of a mounting device 10 according to the invention. Accordingly, the upper casing 40 and the lower casing 50 as well as the mounting portion 20 are formed integrally, preferably as an injection-molded part. As shown, between the individual portions of the mounting device, viz. between the upper casing and mounting portion 20 as well as between the lower casing and the mounting portion 20, respective predetermined breaking points are formed which, in the case of release of the airbag 85, will break when a directed force (e.g. tension by the tether 60 and the airbag, resp.) is applied to the mounting portion 20 so that the mounting case 30 disintegrates into its individual portions 20, 40, 50. The vehicle interior lining 95 is reliably disconnected from the vehicle body 90 in this way.

For the rest, as to design and function, this embodiment preferably corresponds to the first embodiment. As a matter of course, the safety line of the second embodiment can also combined with the third embodiment.

LIST OF REFERENCE NUMERALS 10 mounting device
20 mounting slide/mounting portion
21 extension
22 through-opening
23 upper side
24 lower side
25 locking element
26 lateral surface
27 groove-shaped recess
30 mounting case
31 tongue
40 upper housing
41 mounting pin
42 mounting cap
43 mounting journal
44 groove-shaped recess
45 tongue portion/retaining projection
46 lateral surface
50 lower casing
51 mounting foot
52 clamping lug
53 plug hole
54 groove-shaped recess
55 tongue portion/retaining projection 56 recess/locking seat
57 lateral surface
60 tether
65 seam
70 safety line
80 inflator
85 airbag
90 A pillar/vehicle body
95 vehicle interior lining
F actuating direction

The invention claimed is:

1. A mounting device for mounting a vehicle interior lining to a vehicle body, wherein the mounting device includes a mounting portion that is configured for mounting an airbag, wherein the mounting portion is configured as a further portion that is interposed between a first portion and a second portion of the mounting device, wherein the further portion is in the form of a mounting slide that holds together the first portion and the second portion.

2. The mounting device according to claim 1, wherein the mounting device is configured to divide into plural portions in response to airbag activation so as to cause the mounting of the vehicle interior lining to be released from the vehicle body.

3. The mounting device according to claim 2, wherein at least one of the portions is formed integrally with the vehicle interior lining.

4. The mounting device according to claim 1, wherein the plural portions comprise a first portion in the form of an upper casing and a second portion in the form of a lower casing of a mounting case, wherein the upper casing and lower casing are releasably interconnected.

5. The mounting device according to claim 4, wherein the releasable interconnection of the upper casing and lower casing is formed by a plug connector that releasably interconnects the upper casing and lower casing or by integrally forming the upper and lower casings so as to be separable from each other along a predetermined breaking point.

6. The mounting device according to claim 4, wherein the upper casing includes at least one mounting pin for mounting the vehicle interior lining.

7. The mounting device according to claim 6, wherein the at least one mounting pin is configured to lock with the vehicle interior lining.

8. The mounting device according to claim 6, wherein the lower casing includes at least one mounting foot for mounting on the vehicle body.

9. The mounting device according to claim 8, wherein the at least one mounting foot is configured to lock with the vehicle body.

10. The mounting device according to claim 6, wherein the lower casing includes at least two mounting feet for mounting on the vehicle body.

11. The mounting device according to claim 4, wherein the upper casing is formed integrally with the vehicle interior lining.

12. The mounting device according to claim 4, wherein the upper casing and the lower casing are interconnected by a safety line.

13. The mounting device according to claim 12, wherein the safety line is formed integrally with the upper casing and/or the lower casing.

14. The mounting device according to claim 1, wherein the first portion comprises an upper casing and the second portion comprises a lower casing, the mounting slide interconnecting the upper casing and the lower casing with positive fit.

15. The mounting device according to claim 1, wherein the mounting slide engages retaining projections on the first and second portions.

16. The mounting device according to claim 1, wherein the further portion is formed integrally with the first and second portions and is separable from the first and/or second portions along at least one respective predetermined breaking point so that the first and second portions are separated from each other in this way.

17. The mounting device according to claim 1, wherein the mounting portion is configured as a further portion formed directly on and integrally with the vehicle interior lining so that it is separable from the interior lining along a predetermined breaking point such that the lower casing is separated from the vehicle interior lining.

18. An arrangement comprising at least one mounting device according to claim 1 and a vehicle interior lining which can include an A, C, or D pillar, wherein the vehicle interior lining is mounted on the vehicle body in a built-in state by means of the at least one mounting device, and wherein an airbag is connected to the mounting portion directly or via a tether.

19. The arrangement of claim 18, wherein the airbag or tether is stitched and/or welded and/or glued and/or riveted to the mounting portion.

20. An airbag module comprising an inflator and an airbag inflatable by the inflator, wherein the airbag is connected directly or by a tether to at least one mounting device according to claim 1.

21. A method for opening an airbag in a vehicle equipped with a mounting device for mounting a vehicle interior lining to a vehicle body according to claim 1, wherein the mounting device includes a mounting portion that mounts the airbag, the method comprising the following steps of:
   a) triggering an inflator;
   b) at least partially filling the airbag;
   c) at least partially separating the mounting portion connected to the airbag from at least one further portion of the mounting device;
   d) at least partially releasing the connection between the vehicle interior lining and the vehicle body.

22. A mounting device for mounting a vehicle interior lining to a vehicle body, wherein the mounting device includes a mounting portion that is configured for mounting an airbag,
   wherein the mounting device is configured to divide into plural portions in response to airbag activation so as to cause the mounting of the vehicle interior lining to be released from the vehicle body,
   wherein the plural portions comprise a first portion in the form of an upper casing and a second portion in the form of a lower casing of a mounting case, wherein the upper casing and lower casing are releasably interconnected, and
   wherein the upper casing and/or the lower casing include(s) a groove-shaped recess in which a mounting slide interposed between the first and second portions of the mounting device can be positively fastened, and/or wherein the mounting slide on its upper side and/or on its lower side includes at least one locking element which engages in a locking seat of the upper casing and/or the lower casing formed to be complementary to said locking element.

23. An airbag module comprising an inflator and an airbag inflatable by the inflator, wherein the airbag is connected directly or by a tether to at least one mounting device according to claim 22.

24. A method for opening an airbag in a vehicle equipped with a mounting device for mounting a vehicle interior lining to a vehicle body according to claim 22, wherein the mounting device includes a mounting portion that mounts the airbag, the method comprising the following steps of:
  a) triggering an inflator;
  b) at least partially filling the airbag;
  c) at least partially separating the mounting portion connected to the airbag from at least one further portion of the mounting device;
  d) at least partially releasing the connection between the vehicle interior lining and the vehicle body.

* * * * *